April 27, 1948.   F. W. STEIN   2,440,386
CELL FOR MEASURING THE ELECTRICAL CHARACTERISTICS OF MATERIALS
Filed Sept. 30, 1943

INVENTOR.
Frederick W. Stein
BY
ATTORNEY.

Patented Apr. 27, 1948

2,440,386

UNITED STATES PATENT OFFICE 2,440,386

CELL FOR MEASURING THE ELECTRICAL CHARACTERISTICS OF MATERIALS

Frederick W. Stein, Atchison, Kans.

Application September 30, 1943, Serial No. 504,404

8 Claims. (Cl. 175—183)

My invention relates to apparatus for testing materials and more particularly to a device for determining the relative proportions of two known constituents intimately mixed together.

The percentage composition of a mixture of two known constituents can be readily determined by employing the mixture as a dielectric between the plates of a condenser and impressing a high frequency current across the plates. The capacitive and resistive impedance effect to the passage of the high frequency current through the material being tested is registered by an ammeter in the circuit. Since the dielectric values of the individual constituents are known or can be easily determined, the relative proportions of the constituents in the mixture can be readily computed from the data obtained in any manner well known to the art.

The construction shown is particularly adapted to the determination of the constituency of fluids, fluid suspensions, emulsions and flowable substances.

An important object of my invention is to provide a condenser or cell of the type employed in an apparatus of this character that will hold the mixture being tested so that its electrical characteristics can be accurately determined.

If an accurate reading is to be obtained, the cell must be absolutely clean before it is charged with the material. Accordingly, another object of my invention is to provide a cell that can be easily and thoroughly cleaned each time it is used.

Still another object of my invention is to provide a cell that is simple in construction and inexpensive to manufacture.

Other objects and advantages of the invention will be apparent during the course of the following description.

Figure 1:
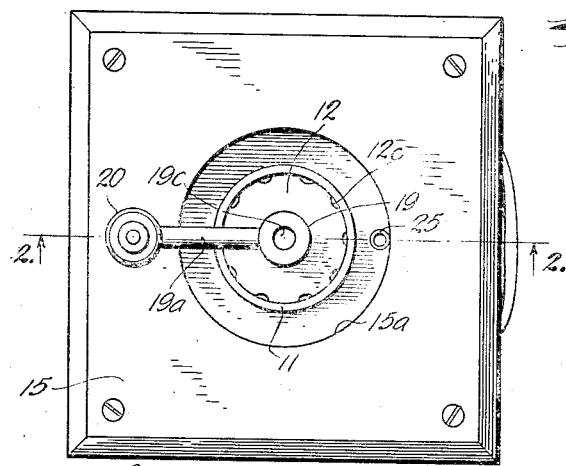
Figure 3:
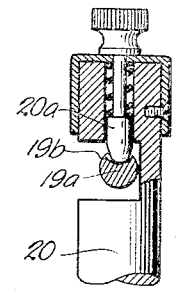
Figure 2:
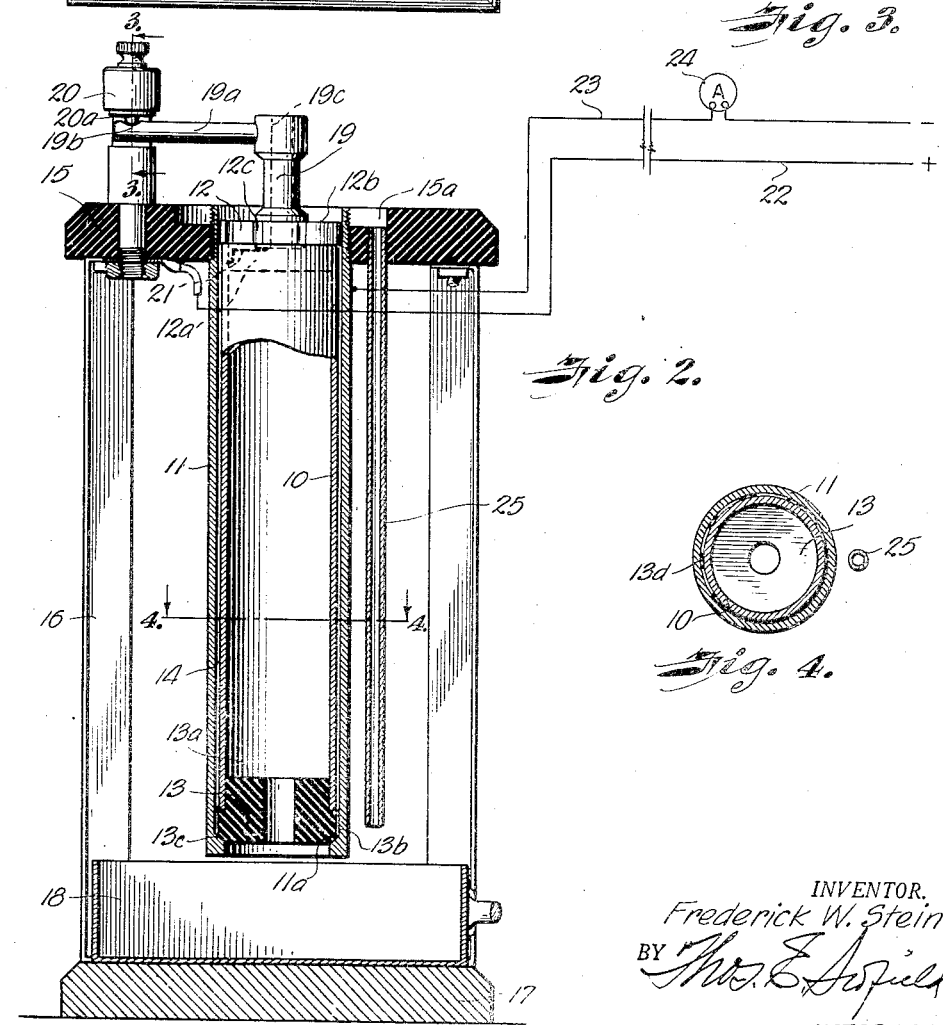
Figure 4:
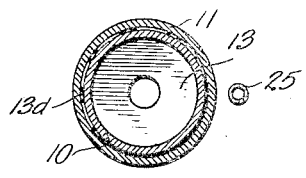

In the drawing, forming a part of this specification, and wherein like numerals are employed to designate like parts throughout the same, Fig. 1 is a top plan view of a cell or condenser embodying my invention, Fig. 2 is a vertical sectional view of the same taken on the line 2—2 of Fig. 1, parts being shown in elevation for clearness of illustration, Fig. 3 is a fragmentary vertical sectional view taken on the line 3—3 of Fig. 2, and Fig. 4 is a transverse sectional view taken on the line 4—4 of Fig. 2.

In the preferred embodiment of my invention shown in the drawing the condenser plates are in the form of concentric inner and outer tubes 10 and 11. The tubes are made of conducting material and are held in fixed spaced relation by upper and lower insulating disks 12 and 13. As shown in Fig. 2 the disks have bosses 12a and 13a fixedly retained in the open ends of tube 10 and radial flanges 12b and 13b which wipingly engage the inner wall of tube 11 and hold the tubes properly spaced apart. The chamfered surface 13c of disks 13 rests upon the internal annular seat 11a to seal the bottom of annular space 14 between tubes 10 and 11.

The cell is held in a vertical position by a frame comprising a top 15, standards 16, and bottom 17. The threaded upper end of tube 11 is screwed into a central opening in top 15, the greater portion of the tube being suspended below the cover and with its open lower end immediately above a removable pan 18.

Centrally of the upper disk 12 is located a vertical post or pillar 19 having a laterally extending latch arm 19a adapted to swing horizontally into a recess in a stationary keeper 20, the latter being attached to cover 15 outside of tube 11. A spring pressed detent 20a mounted in keeper 20 engages a recess 19b in latch arm 19a to detachably hold and bring downward pressure to bear on the arm. Latch 19 and keeper 20 are of conducting material and the latch makes electric contact with inner tube 10 through conductor 21.

A high frequency current is supplied to tube 10 through conductor 22, keeper 20, latch 19 and conductor 21, and after bridging annular space 14 the current passes from tube 11 through conductor 23. Connected in series in conductor 23 is an ammeter 24 which registers the impedance and resistance created by the structure and the fluid being analyzed.

My device is used to measure the resistance afforded by and the electrical characteristics of any fluid of fluid mixture of a relatively simple constituency. To charge the cell, material to be tested is poured into the open top of outer tube 11. It will be observed that tube 10 is somewhat shorter than the outer tube so that a well is formed above plug 12 in which the material is retained. From the well the material drains into annular space 14 through vertical grooves 12c in the disk. When charging the cell it is advisable to manipulate arm 19a so that inner tube 10 is rotated to eliminate any air bubbles or other obstructions which may form in space 14. An annular channel 15a in the top face of cover 15 catches any overflow from the condenser and prevents the formation of a film of liquid which would provide a leakage path for current between outer tube 11 and keeper 20. Any overflow accumulating in channel 15a is drained through pipe 25 to pan 18.

After annular space 14 has been filled the latch arm 19a is moved into engagement with detent 20a. This closes the circuit and permits high frequency current to flow through the cell or testing device and ammeter 24. Since the current flowing through the system is a function of the material being analyzed, and in order to measure minute variations in this current, it is important and essential to maintain all other influencing variables relatively constant. Such variable factors include proper positioning of the telescoping tubes and contamination in the annular space between the tubes. Repeated identical positions of the inner tube 10 both rotatively and axially within the outer tube 11 is assured by seating of the chamfered or bevelled portion of the former on the outer tube at 11a and by engagement of the detent 20a with the latch arm 19a. This eliminates variables as to structures and proper cleaning of the tubes eliminates contamination in the annular space. As a consequence, an accurate analytic electrical reading can be made of the fluid contained in the annular space. It has been observed that slight deflections of the ammeter needle occur for different adjusted positions of tube 10. Since the diameters of the tubes 10 and 11 are constant the instant construction leaves only one variable to affect the ammeter reading, i. e., the character of the particular mixture being analyzed. Before testing the ammeter is adjusted so that its needle assumes a neutral or zero position when the dielectric in annular space 14 is air. When the air in space 14 is displaced by the material being tested the resistance change will be measured by the deflection of the ammeter needle. From the ammeter reading the percentage amounts of the constituents comprising the mixture is determined.

In practically all methods for determining the percentage amounts of the constituents in a mixture the temperature at which the resistance is measured is a factor. Accordingly, I provide a vertical bore 19c in post 19 through which a thermometer can be lowered into tube 10.

After the material has been tested it is released from the cell by disengaging latch arm 19a from keeper 20 and lifting the inner tube 10 from tube 11. As soon as lower disk 13 is lifted from seat 11a the material in spaces 14 discharges through vertical grooves 13d shown in Fig. 4 into pan 18. As soon as the material has drained from the annular space tube 10 can be easily removed. When separated, tubes 10 and 11 can be easily and thoroughly cleaned.

From the above the utility of the device is obvious. It is used to determine the dielectric constant of a liquid, the specific gravity of liquids, the octane number of gasolines, the amount of water in aqueous emulsions and the amount of solids suspended in liquid mixtures. I have found the cell particularly useful in determining the amount of butterfat in milk or butter. The butterfat is extracted by a fat solvent and the mixture or solution poured into the cell. Many other uses are contemplated and are within the scope of my invention.

It is to be understood that the form of the invention herewith shown and described is to be taken as a preferred embodiment of the same and that various changes in the size, shape and arrangement of parts may be resorted to without departing from the spirit of my invention or the scope of the appended claims.

Having thus described my invention, I claim:

1. In a cell for determining the electrical characteristics of materials, a frame with an upper insulating support member, inner and outer concentric spaced apart tubes the outer tube suspended from the support member upper and lower insulating spacers mounted on the ends of the inner tube and engaging the inner surface of the outer tube to hold the tubes in insulated spaced relationship, the assembly of the upper extremity of the outer tube and upper spacer member forming a well, passageways through said upper spacer connecting said well with the annular space between said tubes for draining fluid from the well into said annular space.

2. A cell as in claim 1 with an annular channel formed in the support member around the upper extremity of the outer tube, an overflow pipe from the channel and a removable receptacle beneath the tubes and overflow pipe carried by the frame.

3. In a cell for determining the electrical characteristics of materials, a frame with an upper insulating support member, vertical concentric spaced apart inner and outer tubes of conducting material the outer tube suspended from the support member, said outer tube having an internal annular seat adjacent its lower end, insulating spacers mounted on the ends of the inner tube and extending radially therefrom to engage the inner surface of the outer tube, said lower spacer adapted to rest upon the annular seat of the outer tube, passageways through the radially extending portion of the lower spacer whereby material in the annular space between the tubes is drained upon unseating of the lower spacer.

4. A cell as in claim 3 including a removable receptacle beneath the tubes and carried by the frame.

5. In a cell for determining the electrical characteristics of materials, an outer tube of conducting material suspended from an insulating support, an inner tube of conducting material concentrically positioned within the outer tube, upper and lower insulating disks adapted to hold the tubes in spaced apart relation, a post having a swinging arm mounted at the upper end of the inner tube with an electrical connection to said tube, a stationary keeper mounted on the insulating support adjacent the post and within the arc of travel of the swinging arm, said keeper and arm comprising an electrical switch which is closed when the arm is in engagement with the keeper and open when the arm is disengaged from the keeper.

6. A cell as in claim 5 with longitudinal passageways through the upper insulating disk for introducing materials to be tested to the annular space between the tubes.

7. A cell as in claim 5 with an internal annular seat formed in the lower extremity of the outer tube for seating the lower insulating disk.

8. A cell as in claim 5 with an internal annular seat formed in the lower extremity of the outer tube for the lower insulating disk and longitudinal passageways through the upper and lower insulating disks for introducing materials to the annular space between the tubes and discharging materials therefrom.

FREDERICK W. STEIN.

REFERENCES CITED

The following references are of record in the file of this patent:

UNITED STATES PATENTS

| Number | Name | Date |
|---|---|---|
| 1,020,001 | Van Pelt | Mar. 12, 1912 |
| 1,657,421 | Trenel | Jan. 24, 1928 |
| 2,014,566 | Haskell | Sept. 17, 1935 |
| 2,082,213 | O'Donnell | June 1, 1937 |
| 2,215,213 | Ellis | Sept. 17, 1940 |
| 2,315,805 | Mayo et al. | Apr. 6, 1943 |